United States Patent [19]
Chandra

[11] 3,890,359
[45] June 17, 1975

[54] COMPLEXES CONTAINING SULPHUR

[75] Inventor: Grish Chandra, Penarth, Wales

[73] Assignee: Dow Corning Limited, Barry Glamorgan, Wales

[22] Filed: Jan. 30, 1974

[21] Appl. No.: 438,123

[30] Foreign Application Priority Data
Feb. 7, 1973   United Kingdom................ 5962/73

[52] U.S. Cl.... 260/429 R; 252/431 R; 260/448.2 N
[51] Int. Cl. ............................................ C07f 15/00
[58] Field of Search .................. 260/429 R, 448.2 N

[56] References Cited
UNITED STATES PATENTS
3,555,066   1/1971   Le Grow ...................... 260/448.2 N
3,762,809   4/1973   Allum et al. .................... 260/429 R
3,763,197   10/1973   Collier et al. ................... 260/429 R Primary Examiner—Arthur P. Demers
Attorney, Agent, or Firm—Robert F. Fleming, Jr.

[57] ABSTRACT

Rhodium (III) complexes of the general formula $$RhX_3(SR'R'')_3$$

in which each X represents Cl, Br or I, R' represents $R_3SiQ-$ wherein R is alkyl, aryl, aralkyl, alkaryl or trimethylsilyl and Q represents a divalent aliphatic hydrocarbon radical, and R'' represents alkyl, aryl, aralkyl, alkaryl or $R_3SiQ-$.

The complexes are useful as catalysts in reactions between compounds containing silicon-bonded hydrogen atoms and compounds containing aliphatic unsaturation.

9 Claims, No Drawings

COMPLEXES CONTAINING SULPHUR

This invention relates to new and useful complexes containing silicon and sulphur. It also relates to the use of such complexes as catalysts for hydrosilylation reactions.

According to the invention there are provided rhodium (III) complexes of the general formula $$RhX_3(SR'R'')_3$$

in which each X represents Cl, Br or I, R' represents the $R_3SiQ-$ group wherein R represents an alkyl, aryl, aralkyl or alkaryl radical having from 1 to 18 inclusive carbon atoms or a $(CH_3)_3Si-$ group, not more than one R being $(CH_3)_3Si-$, and Q represents a divalent aliphatic hydrocarbon radical having from 1 to 6 inclusive carbon atoms, R'' represents an alkyl, aryl, aralkyl or alkaryl radical having from 1 to 18 inclusive carbon atoms or the $R_3SiQ-$ group, wherein R and Q are as defined above.

In the general formula of the complexes of this invention each R and R'' represent an alkyl, aryl, aralkyl or alkaryl radical having from 1 to 18 inclusive carbon atoms. Examples of such radicals are methyl, ethyl, propyl, butyl, n-octyl, tetradecyl, phenyl, naphthyl, benzyl, and 2-phenylethyl. Preferably the R and R'' radicals are those having less than 8 carbon atoms. The substituents R and R'' may also represent the trimethylsilyl and $R_3SiQ-$ groups respectively, but not more than one R in $R_3SiQ-$ should be the trimethylsilyl group. In the group $R_3SiQ-$ the substituent Q may be any divalent aliphatic hydrocarbon radical having from 1 to 6 inclusive carbon atoms, for example $-CH_2-$, $-CH_2CH_2-$, $-CH_2CH(CH_3)CH_2-$, or cyclohexylene.

The complexes of the invention may be prepared by reacting together (i) a rhodium (III) halide $RhX_3$ and (ii) a silicon-containing sulphide SR'R''. Preferably the reaction is carried out in the presence of a polar solvent, particularly an alcoholic solvent e.g., methyl alcohol or ethyl alcohol. The reaction is illustrated by the equation

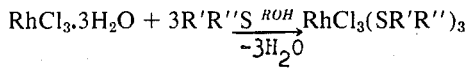

The reaction will proceed at and below room temperature but may be expedited by the application of heat. Preferably the reaction is carried out at a temperature of from about 20°C to the reflux temperature of the reaction mixture. The relative proportions of reactants (i) and (ii) employed is not critical but stoichiometric proportions are preferably used.

Metathetical reactions can also be used and are preferred for the preparation of the complexes where X represents Br or I. The metathetical reaction is illustrated by the equation $$RhCl_3(SR'R'')_3 + 3NaBr \xrightarrow{acetone} RhBr_3(SR'R'')_3 + 3NaCl$$

The silicon containing sulphides SR'R'' employed as reactants in the preparative process are, in general, known materials. They may be prepared, for example, according to the process described in the Journal of Organic Chemistry, 1952, 17, 1393. Examples of such compounds are:

$(C_2H_5)_3SiCH_2SC_6H_5$, $(CH_3)_3SiCH_2SC_2H_5$, $C_6H_5CH_2Si(CH_3)_2(CH_2)_2S(n-C_4H_9)$, $(CH_3)_3SiCH_2CH_2SCH_2CH_3$ and $[(CH_3)_3SiCH_2]_2S$.

Examples of rhodium halides which may be employed in the preparation of the complexes are $RhCl_3.3H_2O$, $RhBr_3.2H_2O$ and $RhI_3$.

The complexes of this invention are useful as catalysts for hydrosilylation reactions, that is reactions involving the addition of silicon-bonded hydrogen atoms to organic radicals containing aliphatic unsaturation.

Included within the scope of this invention therefore is a process for the preparation of an organosilicon product which comprises reacting in the presence of a sulphur containing complex of the invention (a) an organosilicon material having in the molecule at least one silicon-bonded hydrogen atom and (b) an organic or organosilicon material containing aliphatic carbon atoms linked by multiple bonds.

As the organosilicon material (a) there may be employed, for example, one or more silanes or organosiloxanes. Examples of such materials are $HSiCl_3$, $CH_3SiHCl_2$, $C_6H_5SiHCH_3Br$, $(CH_3)_2SiHCl$, $C_2H_5SiH_2Cl$, $CH_3SiH(OCH_3)_2$, methylhydrogen polysiloxanes and copolymers of methylhydrogensiloxane units and, for example, dimethylsiloxane units, trimethylsiloxane units and phenylethylsiloxane units. The nature of the silicon-bonded substituents present in addition to the hydrogen atoms is not critical but normally such substituents will comprise halogen atoms, alkoxy radicals, preferably having less than 6 carbon atoms and monovalent hydrocarbon or halogenated hydrocarbon radicals having from 1 to 18 inclusive carbon atoms.

The compound (b) containing carbon atoms linked by multiple bonds may be organic, for example, pentene-1, heptene-1, acetylene, butadiene, vinylacetylene, cyclohexene, styrene, allyl bromide, vinyl acetate or allyl alcohol, or it may be organosilicon, for example $(CH_3)_2(CH_2=CH)SiCl$, $(CH_2=CHCH_2)_2SiBr_2$, $(CH_2=CH)Si(C_2H_5)_2Cl$, and organosiloxanes and polysiloxanes containing silicon-bonded vinyl and/or allyl radicals. Any remaining silicon-bonded substituents in the unsaturated organosilanes and organosiloxanes may be, for example, halogen atoms, alkoxy radicals having less than 6 carbon atoms and monovalent hydrocarbon or halogenated hydrocarbon radicals having from 1 to 18 inclusive carbon atoms.

The reaction of silicon-bonded hydrogen atoms with unsaturated radicals is well-known and may be employed for the preparation of organofunctional and other organo-silicon compounds and in the preparation of elastomeric or resinous organosilicon products. The hydrosilylation reaction may be performed at temperatures ranging from below 20°C up to and in excess of 150°C.

The complexes of this invention are also useful as hydrogenation and hydroformylation catalysts.

The following examples illustrate the invention. In the examples Me, Et, n-Bu, Vi and Ph represent the methyl, ethyl, n-butyl, vinyl and phenyl radicals respectively.

Example 1

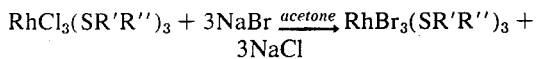

$RhCl_3.3H_2O$ (1.31 g., 1 mol.) and $EtSCH_2SiMe_3$ (2.32 g., 3.1 mol.) were heated together in refluxing methanol (40 ml.) for approximately 6 hours. The solvent was removed under reduced pressure, the residue dissolved in petroleum ether (b.p. 60° – 80°, 8 ml.) containing a few drops of methanol and the solution then cooled at −30° for 1 hour. A small amount of an oil separated. The supernatent red liquid was decanted off and concentrated under reduced pressure to give red viscous mass (2.5 g.) which could not be crystallised. It was heated at 50°/0.1 mm. for approximately 5 hrs. and then analysed. (Found: C, 33.6; H, 7.6; Cl, 16.4. $C_{18}H_{48}Cl_3RhSi_3S_3$ requires C, 33.05; H, 7.3; Cl, 16.3%). The compound solidified on storage.

Example 2

$RhCl_3.3H_2O +$
$3n\text{-BuSCH}_2SiMe_3 \rightarrow RhCl_3(n\text{-BuSCH}_2SiMe_3)_3 + 3H_2O$ $RhCl_3.3H_2O$ (1.0 g., 1 mol.) was heated for 3 hours with n-BuSCH$_2$SiMe$_3$ (2.10 g., 3.1 mol.) in refluxing ethanol (60 ml.) The solvent was removed in vacuo and the red viscous oil, after being heated at 55°/3 hrs., was allowed to stand at 20°C for 2 days. A red crystalline solid was obtained which was recrystallised from light-petroleum (b.p. 40° – 60°) to yield an orange-brown crystalline material (1.7 g.). (Found: C, 37.7; H, 8.0; Cl, 14.1. $C_{24}H_{60}Cl_3RhSi_3S_3$ requires C, 39.05; H, 8.1; Cl, 14.4%).

Example 3

$RhCl_3.3H_2O +$
$3PhSCH_2SiMe_3 \rightarrow RhCl_3(PhSCH_2SiMe_3)_3 + 3H_2O$ $RhCl_3.3H_2O$ (1.58 g., 1 mol.) was heated with PhSCH$_2$SiMe$_3$ (3.62 g., approximately 3.1 mol.) in refluxing methanol (35 ml.) for 6 hours. The reaction mixture was concentrated under reduced pressure to about 15 ml. and then left at −30°C for 12 hrs. The crystals were filtered and washed with cold methanol (3 × 5 ml.) and then dried in vacuo. The product was an or e-brown solid (1.92 g.). (Found: C, 45.1; H, 6.1; Cl, 13.4. $C_{30}H_{48}Cl_3RhSi_3S_3$ requires C, 45.1; H, 6.0; Cl, 13.35%).

Example 4

$RhCl_3.3H_2O + 3(Me_3SiCH_2)S \rightarrow RhCl_3[(Me_3SiCH_2)_2S]_3$ $RhCl_3.3H_2O$ (1.03 g., 1 mol.) and (Me$_3$SiCH$_2$)$_2$S (2.42 g., 3 mol. were heated together in refluxing methanol (20 ml.) for approximately 6 hrs. The reaction mixture was left overnight at 20°C and then filtered. After removal of about 5 ml. of the solvent from the filtrate under reduced pressure orange-red crystals (1.5 g.) were deposited. These were washed with cold methanol and evacuated at 20°/0.1 mm. (Found: C, 35.0; H, 8.1; Cl, 13.2; $C_{24}H_{66}Cl_3Si_6S_3Rh$ requires C, 34.8; H, 8.0; Cl, 12.9%).

Example 5

(Me$_3$SiO)$_2$SiMeH (0.55 g., 1 mol.), Me$_3$SiOSiMe$_2$Vi (0.43 g., 1 mol.) and [RhCl$_3$(C$_2$H$_5$SCH$_2$SiMe$_3$)$_3$] (5 µl of a 3.26% by weight solution in toluene) were heated together at 80°C for 10 mins. About 95 percent overall reaction occurred. Among the products, (Me$_3$SiO)$_2$SiMeCH$_2$CH$_2$SiMe$_2$OSiMe$_3$ was formed in 92 percent yield as shown by gas-liquid chromatographic analysis.

Example 6

(Me$_3$SiO)$_2$SiMeH, (Me$_3$SiO)$_2$SiMeVi, and [RhCl$_3$(BuSCH$_2$SiMe$_3$)$_3$] (in the molar ratio of 1 : 1 : 10$^{-4}$) were heated together at 80°/8 mins. to afford (Me$_3$SiO)$_2$SiMeCH$_2$CH$_2$SiMe(OSiMe$_3$)$_2$ in 95% yield.

Example 7

RhCl$_3$(BuSCH$_2$SiMe$_3$)$_3$ (12.2µl of 6.01% solution in toluene) was added to a mixture of (Me$_3$SiO)$_2$SiMeH (1.11 g., 1 mol.) and CH$_2$=CHCH$_2$(OC$_2$H$_4$)$_3$OH (0.95 g., 1 mol.) in toluene (2.06 g.) at 98°. After a brief induction period an exothermic reaction ensued and the temperature of the reaction mixture rose to ~120°. After 10 minutes (Me$_3$SiO)$_2$SiMe(C$_3$H$_6$)(OC$_2$H$_4$)$_3$OH was formed in approximately 70% yield (authentic g.l.c.).

Example 8

To a mixture of (Me$_3$SiO)$_2$SiMeH (2.22g., 1 mol.) and Me(CH$_2$)$_7$CH=CH$_2$ (1.40 g., 1 mol.) at 100°C was added RhCl$_3$[(Me$_3$SiCH$_2$)$_2$S]$_3$ (7 µl of 12.06% by weight solution in toluene). The temperature of the reaction mixture immediately rose to 145°C. After 10 minutes (Me$_3$SiO)$_2$SiMe(CH$_2$)$_9$CH$_3$ had been formed in 85% yield (authentic g.l.c.).

That which is claimed is:

1. Rhodium (III) complexes represented by the general formula $$RhX_3(SR'R'')_3$$

in which each X is of the group consisting of Cl, Br or I, R′ represents the R$_3$SiQ— group wherein R is a hydrocarbon radical of the group consisting of alkyl, aryl, aralkyl or alkaryl radical having from 1 to 18 inclusive carbon atoms and Q represents a divalent aliphatic hydrocarbon radical having from 1 to 6 inclusive carbon atoms, and R″ is of the group consisting of alkyl, aryl, aralkyl or alkaryl hydrocarbon radicals having 1 to 18 inclusive carbon atoms or the R$_3$SiQ— group, wherein R and Q are as defined above.

2. Complexes as claimed in claim 1 wherein R and R″ each have less than 8 carbon atoms.

3. The rhodium (III) complex having the formula $$RhCl_3(EtSCH_2SiMe_3)_3$$

wherein Me and Et represent the methyl and ethyl radicals respectively.

4. The rhodium (III) complex having the formula $$RhCl_3(n\text{-BuSCH}_2SiMe_3)_3$$

wherein Me and n-Bu represent the methyl and n-butyl radicals respectively.

5. The rhodium (III) complex having the formula $$RhCl_3(PhSCH_2SiMe_3)_3$$

wherein Me and Ph represent the methyl and phenyl radicals respectively.

6. The rhodium (III) complex having the formula $$RhCl_3[(Me_3SiCH_2)_2S]_3$$

wherein Me represents the methyl radical.

7. A process for preparing a complex as claimed in claim 1 which comprises reacting together (i) a rhodium halide RhX$_3$ and (ii) a silicon-containing sulphide of the general formula R′R″S, X, R′ and R″ being as defined in claim 1.

8. A process as claimed in claim 7 wherein the reaction takes place in the presence of a polar solvent.

9. A process as claimed in claim 8 wherein the polar solvent is an alcohol.

* * * * *